Oct. 26, 1948.　　　J. R. PETREE　　　2,452,491
GROUNDING FITTING
Filed Aug. 23, 1946

INVENTOR.
Jay R. Petree
BY Bodell + Thompson
ATTORNEYS.

Patented Oct. 26, 1948

2,452,491

UNITED STATES PATENT OFFICE 2,452,491

GROUNDING FITTING

Jay R. Petree, Fayetteville, N. Y., assignor to Crouse-Hinds Company, Syracuse, N. Y., a corporation of New York Application August 23, 1946, Serial No. 692,461

5 Claims. (Cl. 174—51)

1

This invention relates to a grounding fitting intended particularly for use in places where a grounding circuit extending from various objects is temporarily connected to a grounded circuit. For example, in the operating rooms of hospitals, it is customary to extend an electrical conducting circuit from various pieces of portable apparatus, such as the operating table, anaesthetic gas tank, etc., to a circuit known to be properly grounded. Usually, the grounding circuit also includes the patient and the person administering the anaesthetic. The purpose, in providing these grounding circuits, is to minimize the possibility of a static discharge which would be likely to ignite the fumes of the anaesthetic which usually includes ether, or other compounds of a highly explosive nature.

This invention has as an object a particularly economical and efficient grounding fitting adapted to be embedded in the wall or floor structure of the room, and which embodies a contact projection to which the grounding circuit can be conveniently attached, the structure and arrangement of the fitting being such that when the fitting is not in use, the contact projection can be reversed in the fitting, whereby there is no projection, or extension, beyond the floor or wall surface.

The invention consists in the novel features and in the combinations and constructions hereinafter set forth and claimed.

In describing this invention, reference is had to the accompanying drawings in which like characters designate corresponding parts in all the views.

The fitting comprises an outlet box 10 adapted to be embedded in the floor or wall structure of the room during the construction thereof. The box 10 is formed with an opening 11 in one side thereof and with means for attachment to a grounded conductor, as a conduit line 12, which means may consist of an internally threaded hub 13.

Figure 1:
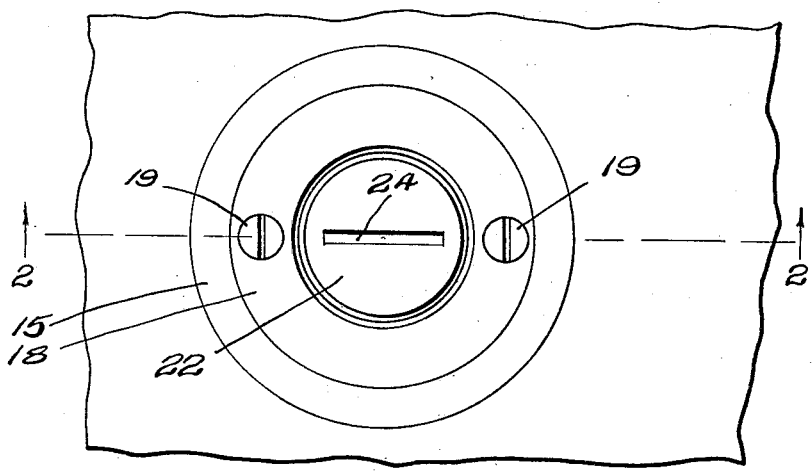
Figure 1 is a top plan view of a grounding fitting embodying my invention.
Figure 2:
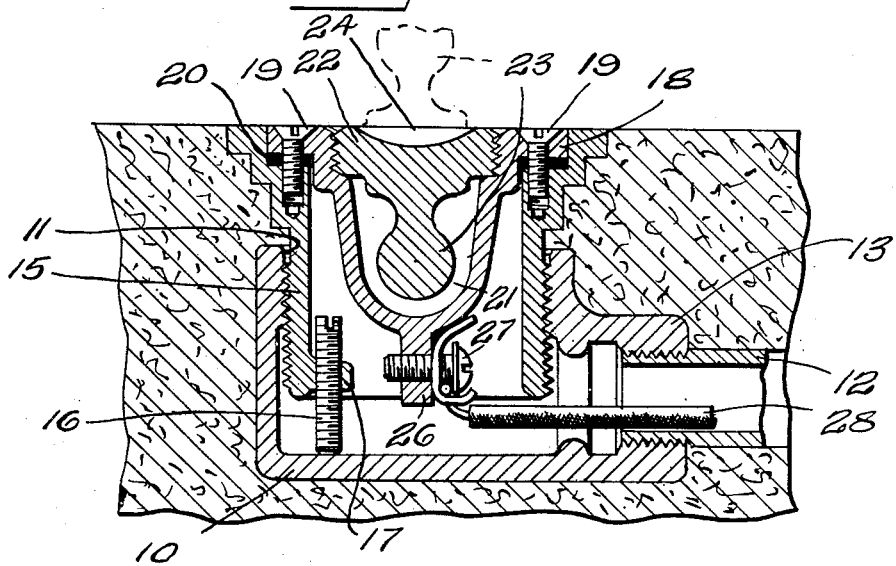
Figure 2 is a sectional view taken on line 2—2, Figure 1.

The box 10 is positioned in the wall structure with the open side of the box accessible through the surface of the structure, and a cover member is detachably secured to the open side of the box. Preferably, a sleeve 15 is arranged in the open side of the box and is adjustable toward and from the surface of the wall. As here shown, the open side of the box is threaded internally,

2 and the lower portion of the sleeve 15 provided with complemental external threads, whereby the sleeve is adjustable toward and from the surface of the wall and is secured in adjusted position by a lock screw 16 threaded through an inwardly extending boss 17 formed at the inner end of the sleeve, the inner end of the screw 16 engaging the bottom wall of the outlet box, see Figure 2.

The outer end of the sleeve is recessed to receive a flange 18 of the cover, the same being detachably secured to the sleeve as by screws 19, and a gasket 20 is interposed between the sleeve and the flange of the cover to effect a water tight joint between those two members, and the arrangement is such that the outer surface of the flange 18 is flush with the surface of the wall or floor structure.

The cover is formed with a central depression 21 extending an appreciable distance in the box, or sleeve, and the open end of the depression is threaded internally to receive the base portion 22 of a contact projection 23.

When the fitting is not in use, the contact projection depends into the recessed portion 21 of the cover, as shown in full line, Figure 2. The base 22 is formed with a recess 24, or the like, to receive a tool, such as a screw driver, for the convenient removal of the contact projection from the cover, and when removed the same may be reversed with the contact extending outwardly, as indicated in dotted outline, Figure 2, and is thereupon accessible for connection of the grounding circuits from the apparatus and persons in the room.

The depressed portion 21 is formed with an extension 26 which may be threaded to receive a binding screw 27, whereby the cover may be directly connected to an additional grounded conductor 28 extending through the conduit 12.

It will be apparent that the fitting is readily made available for use by reversing the contact projection, but normally the projection can be arranged within the depressed portion of the cover, whereby no part of the fitting projects beyond the wall or floor to cause an objectionable obstruction.

What I claim is:

1. A grounding fitting of the type described comprising an outlet box being provided with means for attachment to a grounded conductor and having an open side, a cover detachably secured to the open side of the box and having a depressed central portion extending into the box, a terminal member having a contact projection, and means for detachably securing said member to the cover with the contact projection extending outwardly therefrom, or in reverse position with said contact projection extending in said depressed portion of the cover.

2. A grounding fitting of the type described comprising an outlet box having an opening in one side and provided with means for attachment to a conduit line, said box being adapted to be positioned in a wall or floor structure with the open side of the box accessible through the surface of the wall or floor structure, a cover detachably secured to the open side of the box and being formed with a central depressed portion extending into the box, a terminal member having a contact projection and means operable to detachably secure the terminal member to the cover with said contact projection depending in said depressed portion of the cover, or with said contact projection extending outwardly from the cover.

3. A grounding fitting of the type described comprising an outlet box having an open side and being provided with means for attachment to a conduit line, said box being adapted to be positioned in a wall or floor structure with the open side of the box accessible through the surface of the wall or floor structure, a sleeve mounted in the open side of the box and adjustable toward and from the surface of the wall structure, a cover member detachably secured to the outer end of said sleeve and being formed with a central depressed portion extending into the sleeve, a terminal member formed with a substantially flat base portion and with a contact projecting therefrom, and means for detachably securing said member to the cover with the contact extending outwardly therefrom, or in reverse position with said contact extending into said recess.

4. A grounding fitting of the type described comprising an outlet box having an open side and being provided with means for attachment to a grounded conductor, said box being adapted to be positioned in a wall or floor structure with the open side of the box accessible through the surface of the wall or floor structure, a sleeve mounted in the open side of the box and being adjustable toward and from the surface of the wall structure, means cooperable with said sleeve and box to maintain the sleeve in adjusted position, a cover member detachably secured to the outer end of said sleeve and being formed with a central depressed portion extending into the sleeve, a terminal member formed with a substantially flat base portion and a contact projection, and means for detachably securing the base portion of said terminal member to the cover with the contact projection extending outwardly therefrom, or in reverse position with said contact projection extending into said recess.

5. A grounding fitting of the type described comprising an outlet box having an opening in one side and provided with means for attachment to a grounded conductor, said box being adapted to be positioned in a wall or floor structure, with the open side of the box accessible through the surface of the wall or floor structure, a cover detachably secured to the open side of the box and being formed with a central depressed portion extending into the box, the outer portion of said depressed portion being threaded internally, a terminal member formed with a substantially flat base portion and with a contact projecting therefrom, the periphery of said base portion being provided with threads complemental to the threads in said depressed portion, whereby said terminal member may be threaded into said depressed portion with the contact depending in said depressed portion, or with said contact extending outwardly from the cover.

JAY R. PETREE.

REFERENCES CITED

The following references are of record in the file of this patent:

UNITED STATES PATENTS

| Number | Name | Date |
|---|---|---|
| 681,416 | Goehst et al. | Aug. 27, 1901 |
| 826,097 | Frantzen et al. | July 17, 1906 |
| 1,693,682 | Walker | Dec. 4, 1928 |